United States Patent [19]

Tsuchiya et al.

[11] Patent Number: 5,210,822
[45] Date of Patent: May 11, 1993

[54] STORAGE CONTROL SYSTEM FOR PRINT IMAGE DATA

[75] Inventors: Tadashi Tsuchiya; Hirro Fujisaki; Masayuki Kanda, all of Hadano, Japan

[73] Assignees: Hitachi, Ltd., Chiyoda; Hitachi Information Network, Ltd., Tokyo; Hitachi Computer Engineering Co., Ltd., Kanagawa, all of Japan

[21] Appl. No.: 799,147

[22] Filed: Nov. 27, 1991

[30] Foreign Application Priority Data

Nov. 28, 1990 [JP] Japan ................................ 2-326502

[51] Int. Cl.5 ............................................ G06K 15/00
[52] U.S. Cl. .................................... 395/115; 395/165
[58] Field of Search ............... 395/101, 115, 116, 400, 395/164, 165, 166; 358/444, 460; 340/798, 799, 802, 800, 807

[56] References Cited

U.S. PATENT DOCUMENTS 5,003,496 3/1991 Hunt, Jr. et al. .................... 395/116

FOREIGN PATENT DOCUMENTS

60-209880 10/1985 Japan ................................ 395/101
59-196292 4/1986 Japan ................................ 395/101

Primary Examiner—Arthur G. Evans
Attorney, Agent, or Firm—Antonelli, Terry, Stout & Kraus

[57] ABSTRACT

A storage control system for a print image data in a print control apparatus includes a unit for generating a print image expressed by a set of a plurality of dots as a digital data having a dot carrying a two-dimensional address corresponding to a bit, an address conversion unit for converting a digital data carrying a two-dimensional address into a digital data carrying a one-dimensional address, and a full-dot memory for storing a digital data carrying a one-dimensional address in a one-dimensional address structure.

5 Claims, 9 Drawing Sheets

STORAGE CONTROL SYSTEM FOR PRINT IMAGE DATA

BACKGROUND OF THE INVENTION

The present invention relates to a print control apparatus, or more in particular to a print image data storage system capable of efficiently using a full-dot memory for storing a page image data in a print control apparatus.

A printing apparatus for preparing a one-dot one-bit print image data from a print data expressed in a plurality of dots and transferring a prepared image data to a printing mechanism to produce a print is comprised of a page memory for forming an image data corresponding to the print image. The page memory is used to store an image data covering one page of print unit and is also called a full-dot memory. An image data to be printed is developed in a full-dot memory.

The full-dot memory normally has an address (x, y) of a two-dimensional coordinate corresponding to a dot coordinate in order to attain correspondence to a two-dimensional print image. This address is designated by two registers for x and y register addresses.

There are two page print forms: One is a portrait (longitudinal) 22 shown in FIG. 1B, and the other a landscape (lateral) 21 shown in FIG. 1A. A print image data, if to be adaptable for both of the print forms, is required to be developed in a full-dot memory 10 regardless of the direction of the page data. It is also necessary that image data of variously different sized sheets can be developed in the full-dot memory.

In the case of storing a print area of 400 dpi (dots/inch), A3 size (11.7"×16.5") in the full-dot memory 10, for example, bits in the number of 16.5×400 which is equivalent to 825 bytes are required along the lateral direction of the raster in order to accommodate an area of a landscape (11.7" by 16.5"). Assuming an X address register of one word (four bytes), a maximum of 207 (=825+4) words are available for each row. An 8-bit word address register is therefore necessary for the X direction. If each bit position of 16.5×400 bits is to be designated directly, on the other hand, 13-bit addresses are required. In the longitudinal direction, a raster in the number of 16.5×400 (=6,600) (the number of bits in the longitudinal direction) are necessary to accommodate a portrait area (16.5" by 11.7"). A 13-bit register is used as a y address register for designating a raster in the longitudinal direction.

Figure 2:
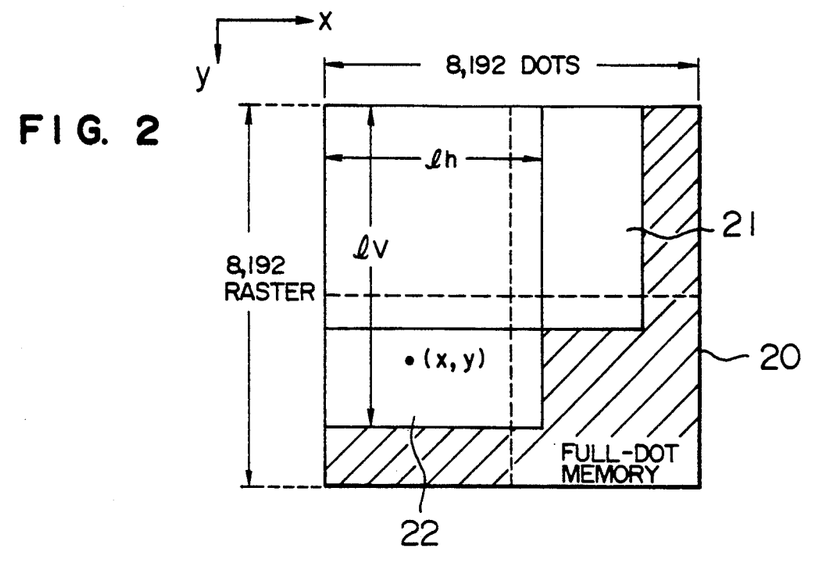
FIG. 2 is a diagram for explaining the case in which a sheet of the same size as in FIG. 1 is printed in a different printing form and an image data is stored in a common two-dimensional full-dot memory.

FIG. 2 is a diagram illustrating a memory map with a segment configuration of a two-dimensional full-dot memory. To facilitate the understanding, explanation will be made first about the case in which a page of area is set by a two-dimensional address. A one-page area for storing a print image data is set in an area 20 of full-dot memory on one segment. As shown in FIG. 2, for example, an area for accommodating a landscape 21 or an area for accommodating a portrait 22 by a two-dimensional address is set in the area 20 on a segment of the full-dot memory. The diagram represents an area accommodating an A3-sized landscape 21 by a two-dimensional address (x, y) and an area accommodating an A3-sized portrait 22 by a two-dimensional address (x, y).

In the case where the area 20 on one segment of a full-dot memory is set by a two-dimensional address in this way, it is necessary to configure both lateral and longitudinal directions to 8,192 dots, i.e., to the capacity with the length of 20.48" for each direction. If an area 20 on one segment of a full-dot memory is configured of two-dimensional addresses representing 8,192 bits for both lateral and longitudinal directions in this way, a 13-bit address is involved for both x and y addresses. If one dot is made to correspond to one bit of memory and the A3-sized sheet to both the landscape and portrait, therefore, a capacity of 8 MB is required for one segment of a full-dot memory in the case of a two-dimensional address (x, y).

Figure 1A:
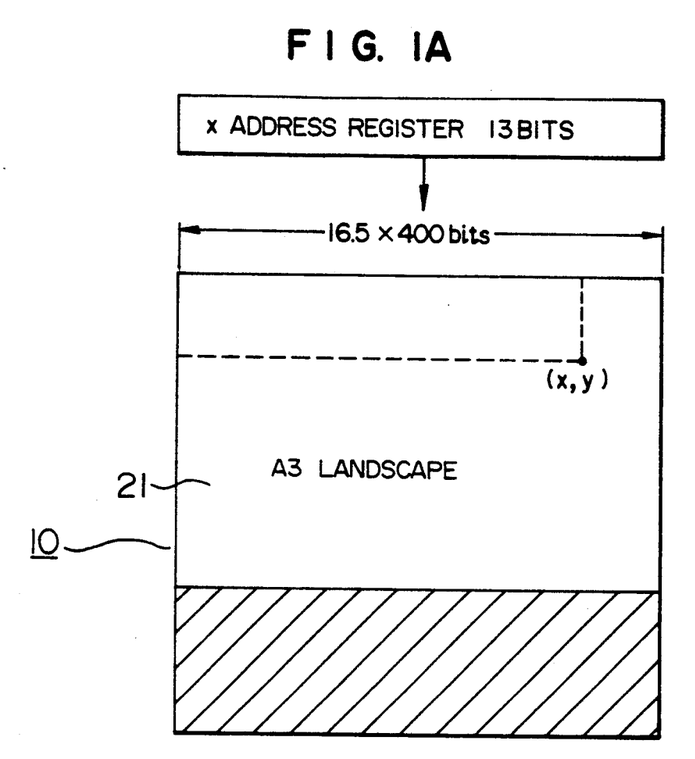
FIGS. 1A and 1B are diagrams for explaining by comparing the size of the printing sheet and the capacity of a two-dimensional full-dot memory.
Figure 1B:
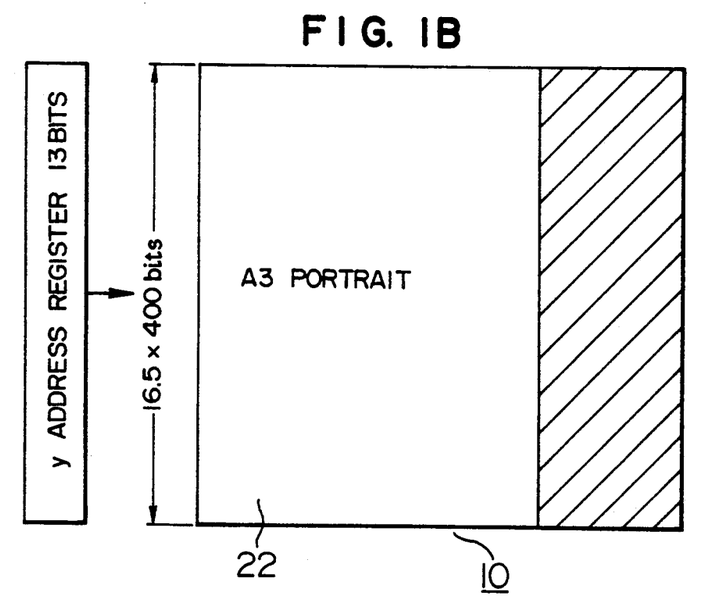

On the other hand, the amount of bits of an A3-sized sheet is 3.86 MB for 400 bpi regardless of landscape or portrait. As a result, only 3.86 MB out of the capacity 8 MB of the full-dot memory is consumed, while the remaining approximately half memory capacity is left unused. In other words, the hatched portions of FIGS. 1A and 1B are not used.

As described above, if a full-dot memory is allotted directly to a two-dimensional address (x, y), the effective use of a memory is impossible although the access rate is advantageously improved. Especially when storing a multiplicity of pages in a full-dot memory for a two side printer, a high definition of 600 to 1000 dpi in print dot density leads to a very large capacity of the full-dot memory.

An example of a print control apparatus and a memory control using a two-dimensional full-dot memory as described above are disclosed in JP-A-61-75424 and JP-A-60-209880.

SUMMARY OF THE INVENTION

The object of the present invention is to provide an image data storage control system capable of improving the utility of a full-dot memory for storing a print data indicated by a two-dimensional address and reducing the physical memory capacity.

In order to achieve the above-mentioned object, according to the present invention, there is provided a print image data storage system comprising a unit for generating a print image expressed by a set of a plurality of dots as a digital data with a bit corresponding to a dot designated by a two-dimensional address, an address conversion unit for converting a digital data with a two-dimensional address into a digital data with a one-dimensional address, and a full-dot memory for storing a digital data with a one-dimensional address in a one-dimensional address configuration.

The address unit converts a two-dimensional address data into a one-dimensional address data. Upon application thereto of a two-dimensional address data indicating a print position in the sheet of a print data, the address conversion unit converts the two-dimensional address data into a one-dimensional address to make access to the full-dot memory of the one-dimensional address configuration.

The address conversion unit for converting a two-dimensional address (x, y) designating an in-sheet print position of a print data into a one-dimensional address w regards the sheet size as a rectangular area with an origin ($x_0$, $y_0$) at the upper left corner, a lateral size of lh (in unit of dots), a longitudinal size of lv (in unit of dots), and a two-dimensional address (x, y) located at a given point in the rectangular area. The one-dimensional address w, therefore, can be determined by a simple algebraic expression. Also, in order to convert a two-dimensional address into a one-dimensional address at high speed, the address converter includes a multiply memory for storing the result of multiplication of a y address by the lateral width of the sheet in table form. The y address and the sheet width data are applied as addresses of a multiply memory, so that conversion from a two-dimensional to one-dimensional address is effected by memory access.

For this reason, the full-dot memory is accessed by a one-dimensional address, thereby eliminating a wasteful unoccupied area by the difference in the setting of a print-size area. The resulting improved memory utility saves the memory capacity in physical terms.

Even when a full-dot memory has a plurality of areas for print sheet pages with a plurality of corresponding pages of areas, the fact that the full-dot memory is accessed by a one-dimensional address makes it possible to set the area of each page in sequential and continuous fashion. As a result, the full-dot memory is accessed in such a manner that the head print data of the (k+1)th raster has a storage address of n+1, where n is the storage address of the last print data of the k-th raster in the longitudinal direction of each page area of the print image, so that areas of a plurality of pages are set in continuous fashion.

The result is that even when a plurality of pages are set in a full-dot memory, the difference in the setting of a print size area eliminates a wasteful unoccupied area for an improved memory utility, thus saving the memory capacity in physical terms.

DESCRIPTION OF THE PREFERRED EMBODIMENTS

An embodiment of the present invention will be specifically described with reference to the drawings.

Figure 3:
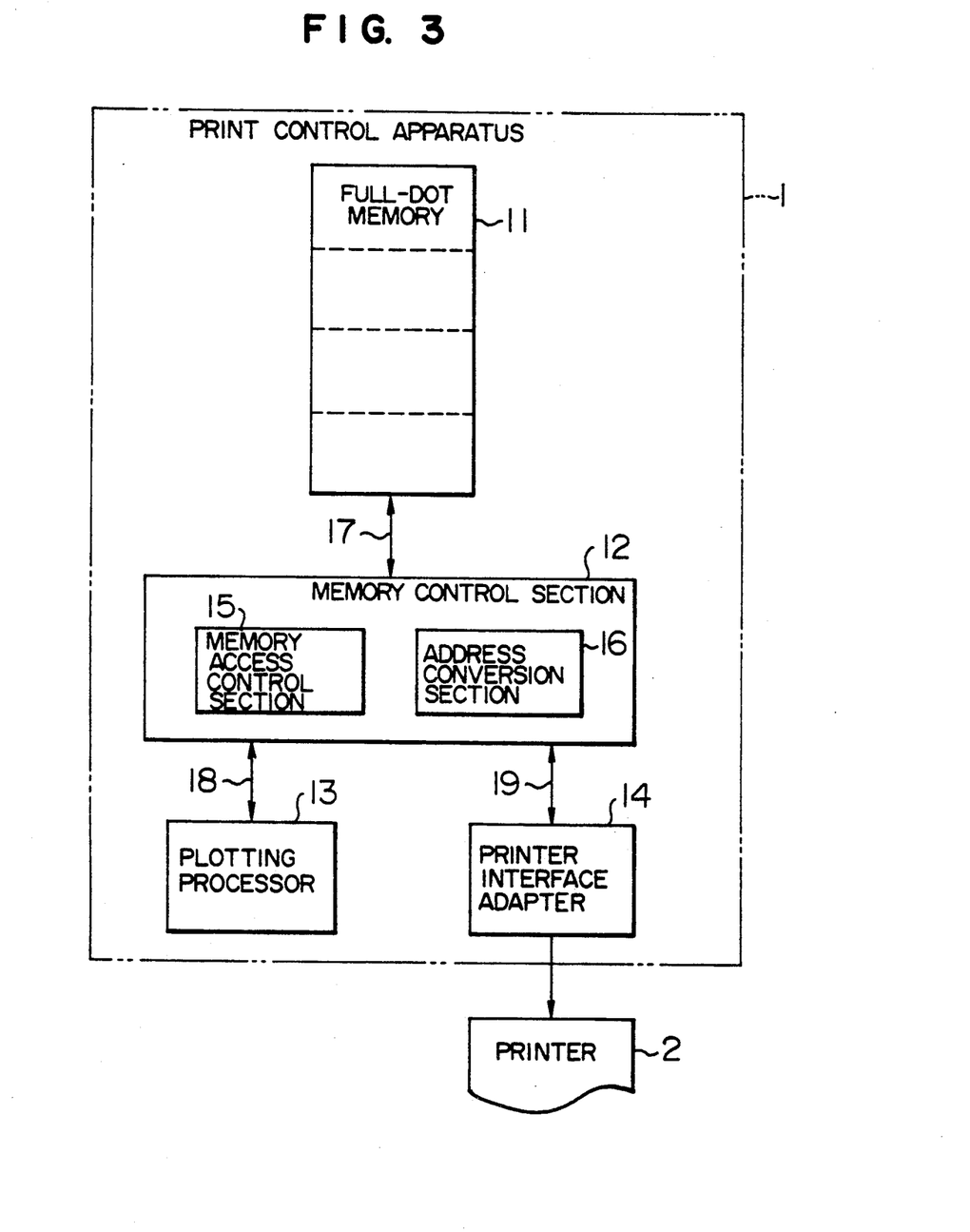
FIG. 3 is a block diagram showing a storage control system for a print image data according to an embodiment of the present invention.

FIGS. 3 is a block diagram showing a configuration of a print control apparatus using a print image data storage control system according to an embodiment of the present invention. In FIG. 3, reference numeral 1 designates a print control apparatus, numeral 2 a printer having a printing mechanism, numeral 11 a one-dimensional full-dot memory, numeral 12 a memory control section, numeral 13 a plotting processor, numeral 14 a printer interface adapter, numeral 15 a memory access control section, and numeral 16 an address conversion section. The block diagram of FIG. 3 represents blocks in a peripheral structure built around the full-dot memory 11 of the print control apparatus 1. The full-dot memory 11 has four segments of storage area corresponding to pages, one of the segments representing 4 MB. The interface 17 connecting the full-dot memory 11 and the memory control section is adapted to transmit and receive an image data of the print image with a one-dimensional address w. The memory control section 12 includes a memory access control section 15 and an address conversion section 16 and is adapted for conversion from a two-dimensional address (x, y) into a one-dimensional address w, as well as the write/read control of the full-dot memory 11. The address conversion section 16 may alternatively be located on the plotting processor 13 or the printer interface adapter 14, in which case the number of the address conversion section 16 is increased in hardware. Instead, if the address conversion section 16 is included in the memory control section 12, only one address conversion section 16 will do as a result of sharing.

The interface 18 between the memory control section 12 and the plotting processor 13 and the interface 19 between the memory control section 12 and the printer interface adapter 14 are both a memory interface based on the two-dimensional address (x, y).

The printer interface adapter 14 is adapted to convert the four-byte image data sent from the full-dot memory 11 through the memory control section 12 into a serial bit data acceptable by the printer 2, and send out a sequential serial data to the printer 2 for each raster.

In the memory control section 12, the memory access control section 15 controls the memory access for each segment of the full-dot memory 11 thereby to control the bit write/read of the dot image data for the full-dot memory 11. The address conversion section 16, on the other hand, is adapted to convert the two-dimensional address (x, y) to the one-dimensional address w. This address conversion using a simple algebraic expression may be effected by the address conversion section 16 included in the memory control section 12. When a high speed is required, a hardware circuit exclusive to the address conversion section 16 is added.

Now, specific explanation will be made about the processes of address conversion from a two-dimensional address data for designating the in-sheet print position of a print data into a one-dimensional address to access a full-dot memory.

A case involving a printing density of 400 dpi will be taken as an example. The style with the two-dimensional address (x, y) is dependent on the sheet size. The sheet is normally available in the following five sizes:

| Symbol | Size | Capacity (MB) |
| --- | --- | --- |
| A5 | 5.82" × 8.26" | 0.96 |
| A4 | 8.26" × 11.7" | 1.93 |
| A3 | 11.7" × 16.5" | 3.86 |
| B5 | 7.2" × 10.1" | 1.45 |
| B4 | 10.1" × 14.3" | 2.88 |

Of all these sizes, A3 is the largest sheet. A sheet with the short side up is called the portrait (longitudinal) and the one with the long side up is called the landscape (lateral). These two types of sizes have different maximum values of coordinates. As a result, a maximum of 4 MB in the capacity of a full-dot memory can accommodate any size of the five types of sheet. The storage area of a full-dot memory corresponding to each page has 4 MB of capacity for each segment totaling 16 MB for the four segments.

As explained with reference to FIGS. 1 and 2, when a two-dimensional full-dot memory is used, a memory capacity of 8 MB is required for accommodating the largest A3-sized sheet in a given direction of landscape or portrait.

Even if the (x, y) coordinate for designing a print data of each page involves a two-dimensional address, however, the conversion of a two-dimensional address (x, y) into a one-dimensional address w for memory access results in the sheet position being not dependent on the area setting and makes sufficient a memory area having a minimum capacity corresponding to the sheet size. As a consequence, the capacity of 3.86 MB covering a substantive area of an A3-sized sheet of one dot corresponding to one bit serves the purpose. Thus each segment of the full-dot memory is configured of an area of 4 BM.

The sheet style is assumed to be a rectangular area measuring lh by lv with a given coordinate (x, y) in the area designated as a two-dimensional address (x, y). This two-dimensional address is converted into a one-dimensional address w, which is in turn used for access. The value w is calculated by the equation shown below.

$$w = y \cdot \left( \left[ \frac{lh - 1}{32} \right] + 1 \right) + \left[ \frac{x}{32} \right]$$

where [ ] is a symbol indicating only the integral part ignoring figures below decimal point.

This conversion equation is equivalent to determining the number of dots from the head address to the position (x, y) on the two-dimensional coordinate. Simplifying the conversion equation, $$w = y \times (max. \text{ number of dots along lateral direction of sheet}) + x$$

The number of dots along lateral direction (x) of the sheet is a constant dependent on the type of sheet and the direction thereof, i.e., portrait or landscape.

Figure 4:
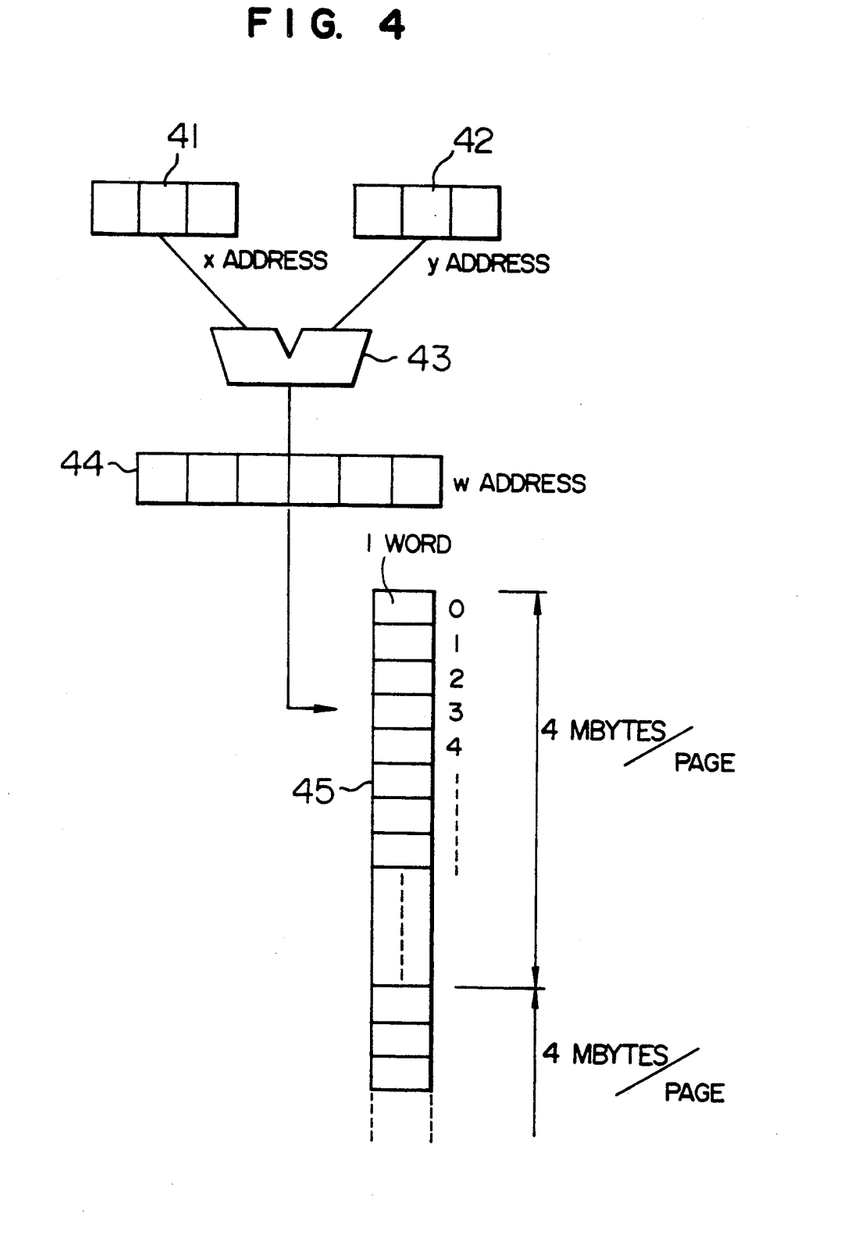
FIG. 4 is a diagram for explaining a configuration of a one-dimensional full-dot memory according to the present invention.

FIG. 4 shows a configuration for conversion from one-to two-dimensional data and a one-dimensional full-dot memory according to the present invention. The x and y addresses are supplied from registers 41 and 42 respectively for storing a two-dimensional address (x, y). An operating section 43 determines a one-dimensional address w from the above-mentioned conversion equation, which address is stored in the one-dimensional address register 44. The one-dimensional full-dot memory 45 has a memory structure stacked along longitudinal direction so that one address represents one word as shown. The one-dimensional full-dot memory 45, like the two-dimensional full-dot memory, may be constructed regardless of the sheet size or direction.

[x/32] in the calculation from the x address value is determined in five bit shifts of x address (13 bits). This is because a memory address is given by one word (32 bits, four bytes). The calculation of [x/32] makes a word address of the one-dimensional address of w. The calculated portion [{(lh−1)/32}+1] from the y address value represents the number of words for one raster, where lh is a value other than zero. The value of the calculated portion obtained from the y address value is a fixed value which remains unchanged during write/read of a particular page, once the sheet size and direction thereof is determined. In the case of an A-sized portrait, for instance, the lateral size is 11.7″ and therefore lh=4,680. Thus the value of [{(lh−1)/32}+1] is 147. The calculation of the product of the value (147) and the y address value is obtained by a number n of adding operations by the adder or by the multiplier, or by reading a memory table without specific calculation. The method of calculation is determined by reference to the speed of the printing mechanism of the printer. In the case where the printer has a low-speed printing mechanism, a high-speed calculation is not required, and therefore the calculation of the above-mentioned equation is effected by programming at the memory control section.

According to this embodiment, an example of calculation will be explained in which values of multiplication in accordance with the y value are registered in advance in a memory table.

The full-dot memory 11 is accessed by a one-dimensional address thus eliminating a wasteful unoccupied area due to the difference in the setting of the print size area. As a result, in the case where a plurality of areas (page segments) are provided for each page of the print sheet in the full-dot memory 11, the full-dot memory 11 is accessed by a one-dimensional address, and therefore, each page area is set continuously. The full-dot memory is thus addressed in such a manner that the one-dimensional storage address of the head print data of the (k+1)th raster is n+1 where the one-dimensional storage address of the last print data of the k-th raster in the longitudinal direction of the area of each page of the print image is n.

As a result, even when a plurality of pages are set in a full-dot memory, a wasteful unoccupied area is eliminated due to the difference in the setting of the area of the print size between the pages, thereby improving the utility of the memory.

FIGS. 5A, 5B, 5C and 5D are diagrams showing a configuration of a register of the address data given as a two-dimensional address. These registers are installed in a plotting processor 13.

Figure 5A:
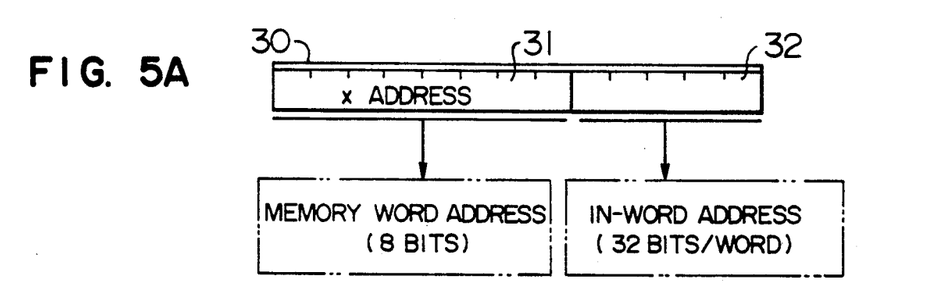
FIGS. 5A, 5B, 5C and 5D show configurations of a two-dimensional address register.
Figure 5B:
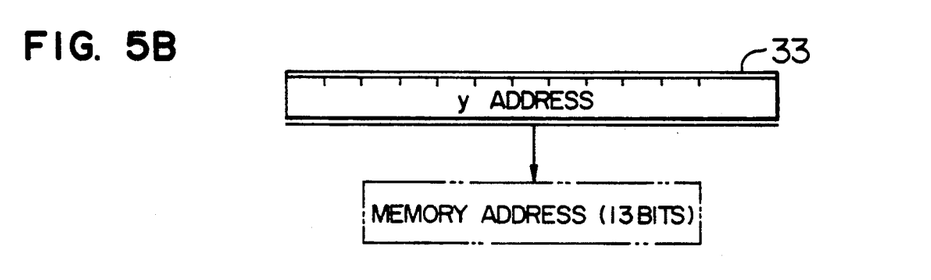
Figure 5C:
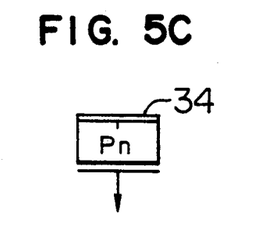
Figure 5D:
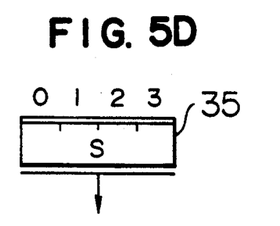

The x address is given by a 13-bit x address register 30 as shown in FIG. 5A. The least significant five bits 32 are used for bit position control of the print data in the plotting processor in order to make 32 bits of a word, and the full-dot memory is supplied with the most significant eight bits 31. Also, as shown in FIG. 5B, the y address is applied to a 13-bit y address register 33. The y address, the 13 bits of which is used as a memory address directly, is sent to the full-dot memory. In addition, as shown in FIG. 5C, a two-bit segment number register 34 is provided for designating the segment number Pn to be used. Also, as shown in FIG. 5D, in order to designate the sheet size S, a four-bit sheet size register 35 is provided. Each bit of the sheet size register 35 designates the size and direction (position) of the sheet for use at the time of memory access. The bit at the extreme left end of the sheet size register 35, if "0", indicates the landscape, and if "1", indicates the portrait. The three bits including first, second and third bits represent the sheet size as shown below.

| 000 | A5 |
| 001 | A4 |
| 010 | A3 |
| 011 | B5 |
| 100 | B4 |

Each register for the print control data is included in the plotting processor 13 and also in the printer interface adapter for reading and sending out the data from the full-dot memory 11 to the printer 2. Each register thus handles the print data with a two-dimensional address. More specifically, the designation of the write and read control to and from the full-dot memory 11 from the plotting processor 13 and the printer interface adapter 14 are handled with a two-dimensional address. The memory control section 12 converts a two-dimensional address to a one-dimensional address at the time of accessing the full-dot memory 11, and the full-dot memory 11 is accessed by a one-dimensional address.

Figure 6:
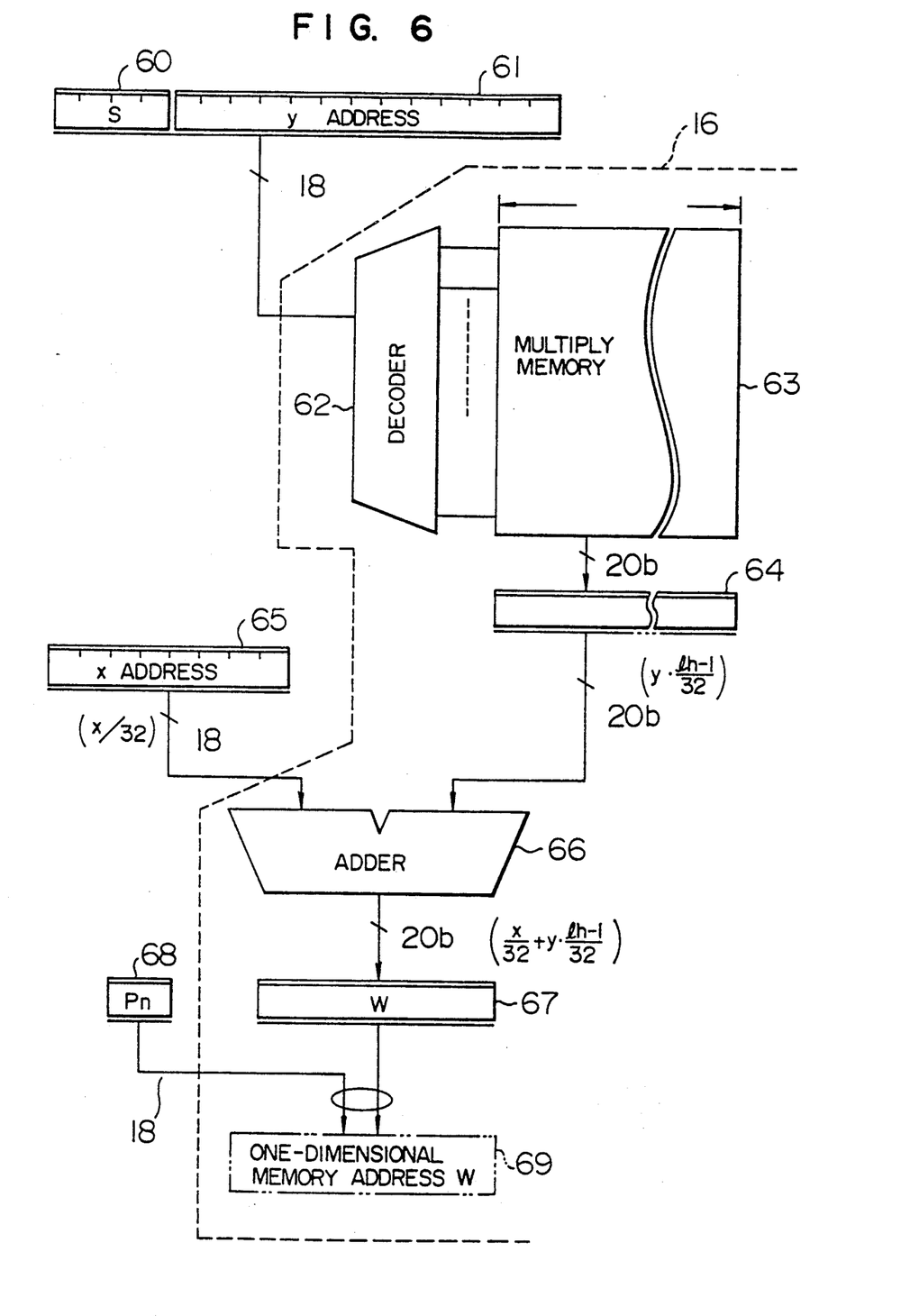
FIG. 6 is a detailed block diagram of an address conversion section.

FIG. 6 is a block diagram showing an example of the hardware circuit configuration making up an address conversion section. The address conversion provides, as described above, the calculation 147 ×y at the multiplication term with the y address value. For this purpose, a multiply memory 63 for storing the result of multiplication 147 ×y in table form is provided to effect the multiplication.

In FIG. 6, numeral 60 designates a sheet size register supplied with the sheet size S, numeral 61 a y address register supplied with a y address value, numeral 62 a decoder for decoding a 17-bit address, numeral 63 a multiply memory, numeral 64 a memory output register, numeral 65 an x address register supplied with the most significant eight bits of the x address value, numeral 66 an adder, numeral 67 an operation result register, and numeral 68 a segment number register.

The y address has 13 bits, and therefore requires 8000 multiplications. This is combined with the sheet size data, with the result that multiplication results in the number of 8000×16 are prepared in the multiply memory 63. A 17-bit address including the bits of the sheet size register 60 and the Y address register 61 is decoded by the decoder 62 thereby to read the multiplication value from the multiply memory 63. The product is applied to the memory output register, and is added to the value from the x address register 65 at the adder 66. The result of addition is obtained at the operation result register 67. The value thus obtained at the operation result register 67 provides the one-dimensional address w. This one-dimensional address w, combined with the value of the segment number register 68, is used as a memory address 69 for the full-dot memory 11.

The address conversion mentioned above, depending on the access time characteristic of a memory used as a multiply memory 63, may be effected in two or three machine cycles. Especially, the performance deterioration due to the multiplication is minimized.

The memory control section 12 according to the present embodiment, which may be constructed by hardware, may alternatively be realized by program control. Flowcharts for write and read control of an image data applied to the program control are shown in FIGS. 7A to 7D.

Figure 7A:
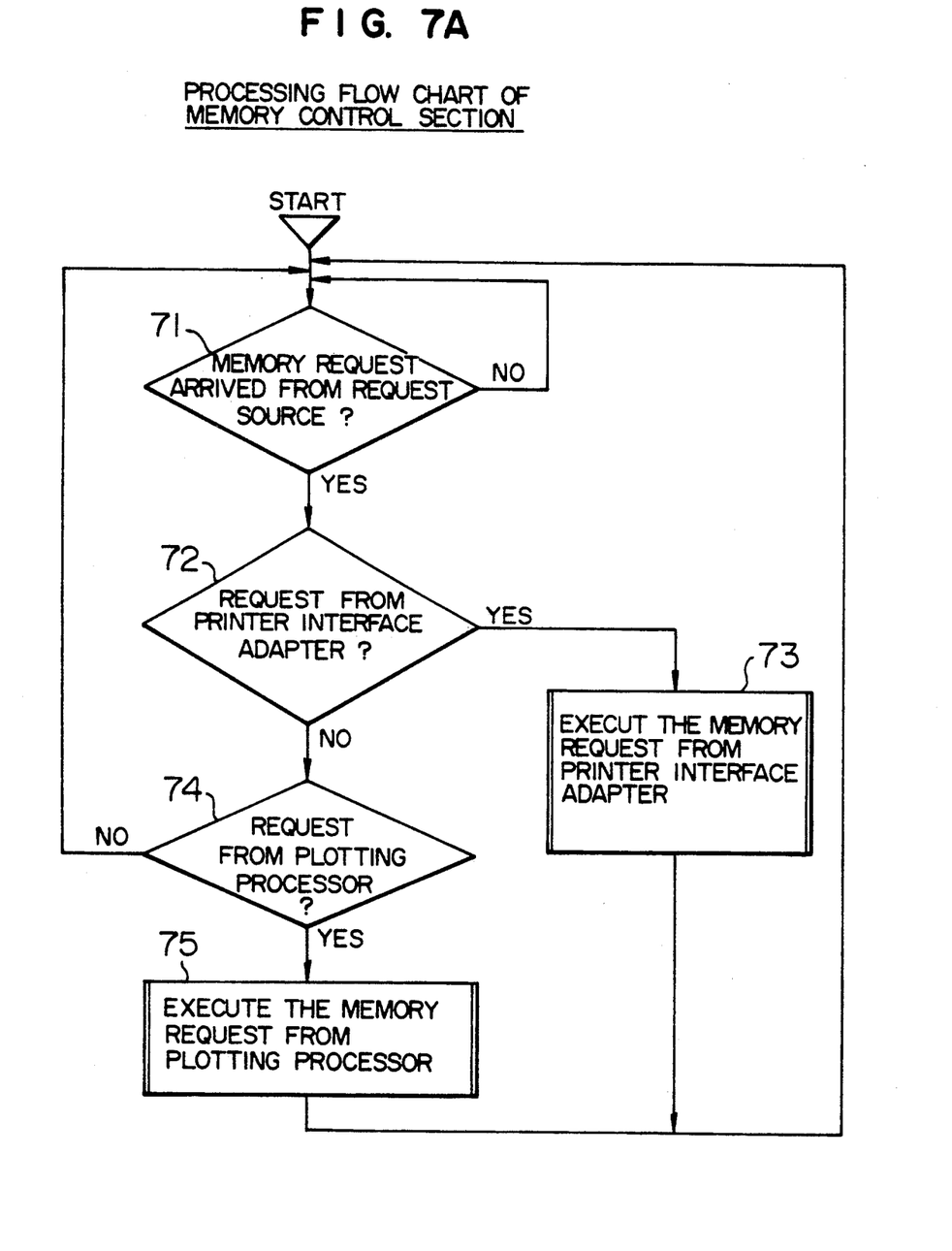
FIGS. 7A to 7D are control flowcharts for the embodiment shown in FIG. 3.

Step 71 decides whether a memory request has arrived from a request source being either a plotting processor 13 or a printer interface 14. With the arrival of a memory request, step 72 decides whether the particular memory request has originated at the printer interface 14. If the answer is affirmative, step 73 processes the memory request. When step 74 decides that the memory request is originated from the plotting processor 13, on the other hand, step 75 processes the memory request.

Figure 7B:
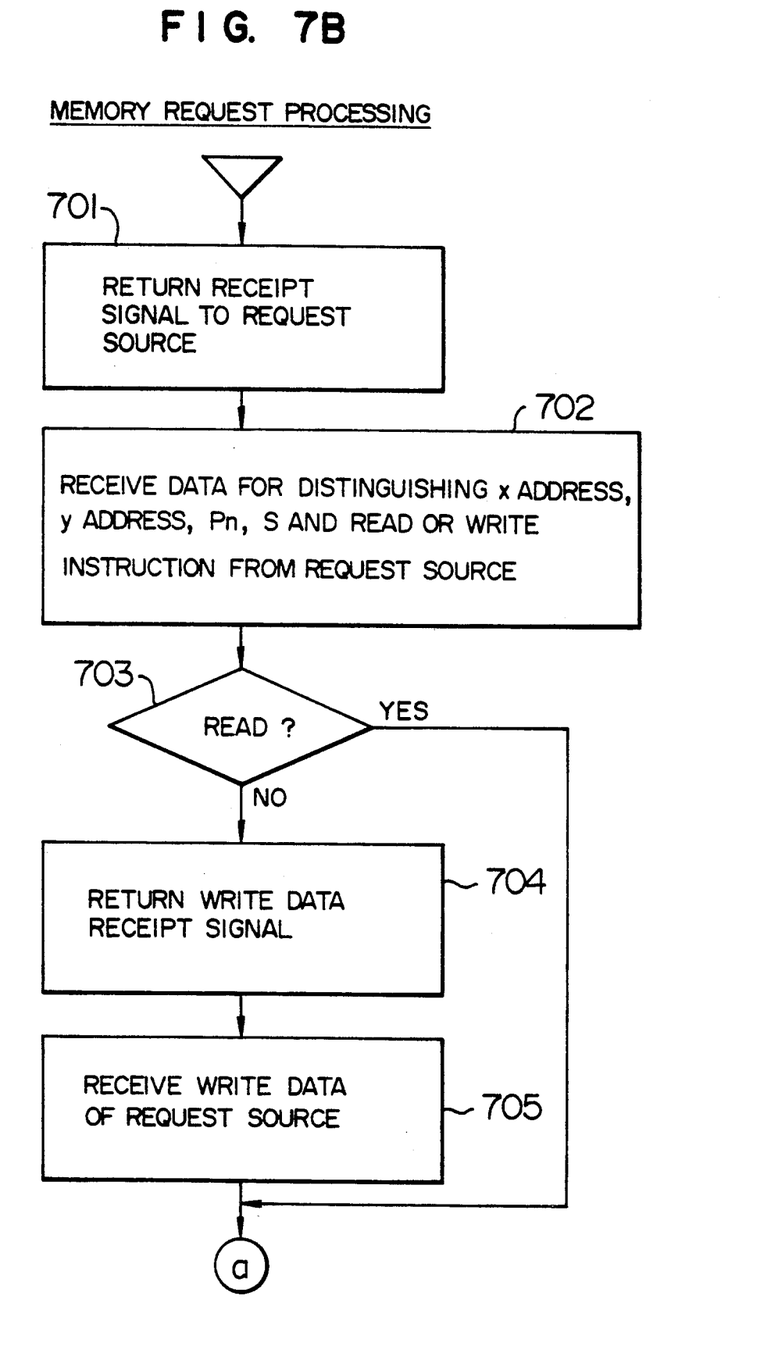
Figure 7C:
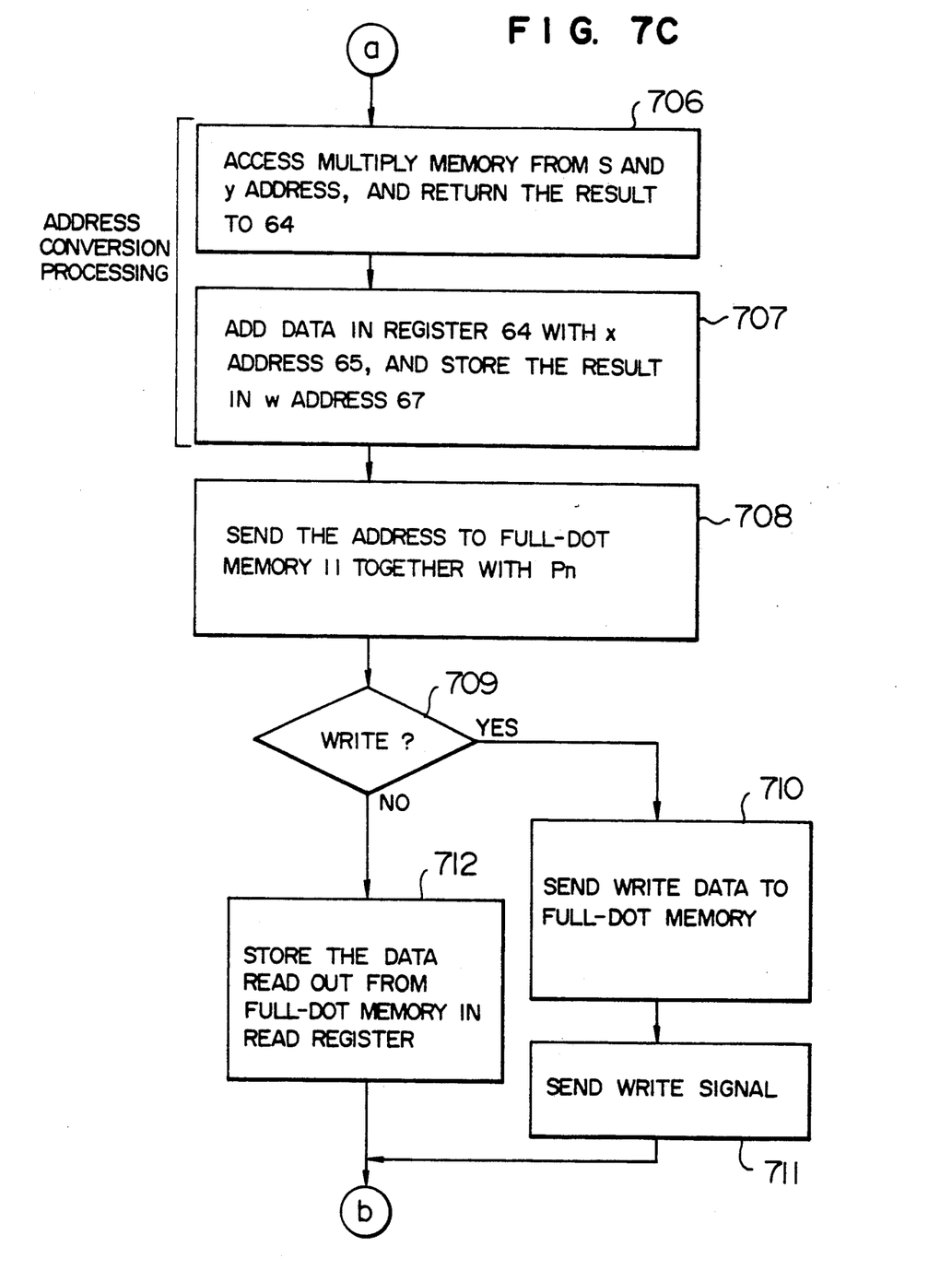
Figure 7D:
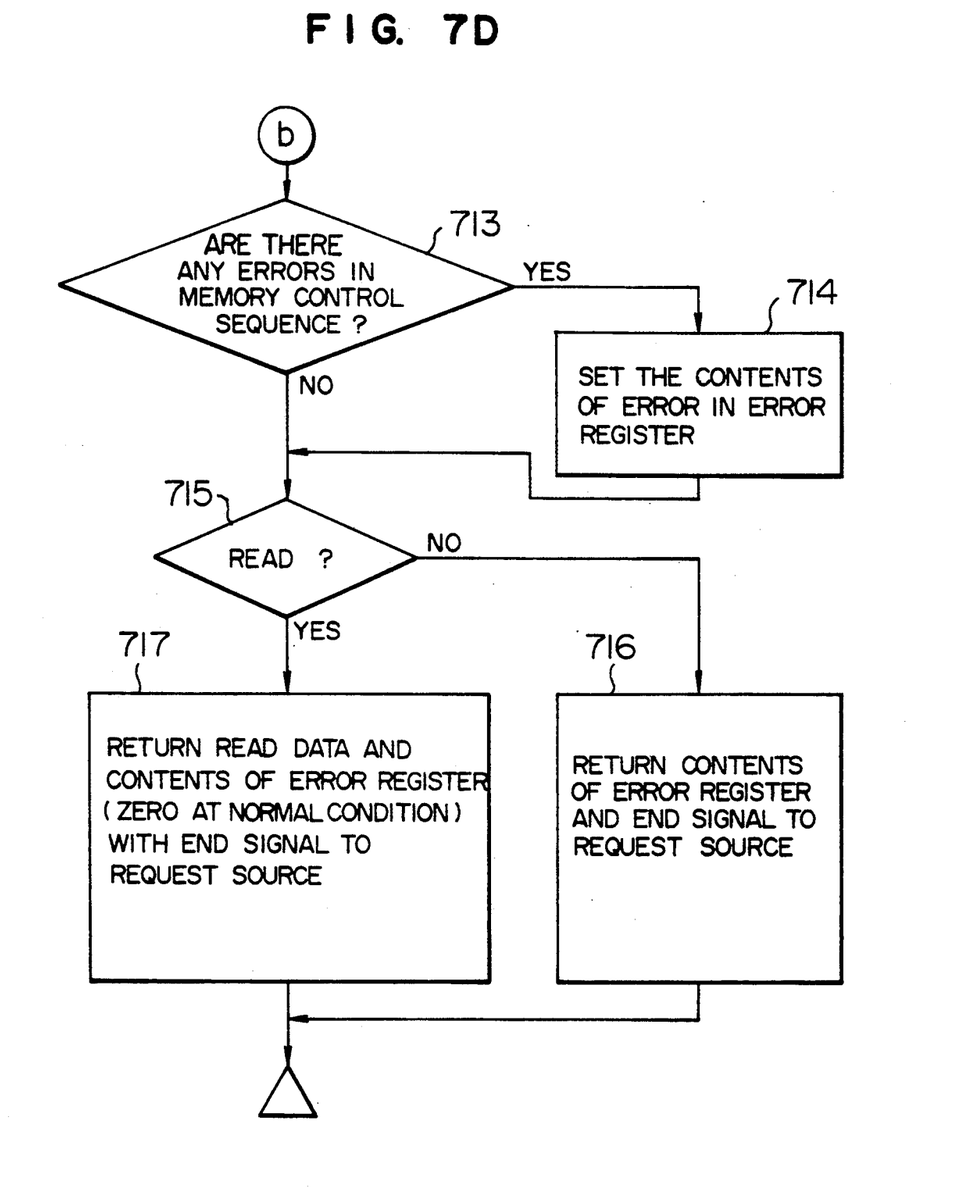

FIGS. 7B to 7D shown a flow of the memory request processes 73 and 75. Step 701 sends to the request source a notice confirming the receipt of a memory request. Step 702 receives an x address, a y address, P, n, S and a read or write instruction from the plotting processor 13 or the printer interface 14. Step 703 decides whether the request is for read or write. If the read is requested, the process proceeds to the flow of FIG. 7C. If the write is the request, on the other hand, the write data receipt signal is returned to the request source at step 704. Step 705 receives a write data from the request source.

Further, step 706 shown in FIG. 7C accesses the multiply memory 63 on the basis of the data S (sheet size) of the register 60 and the y address of the register 61, and applies the result thereof to the register 64. Step 707 adds the contents of the register 64 to the x address of the register 65, and applies the result w thereof to the one-dimensional address register 67. Step 708 sends these data together with the Pn data (segment number) of the register 68 to the full-dot memory 11. Step 709 decides on write or read of a data, and if the answer is write, step 710 sends the write data to the full-dot memory 11. Step 711 sends a write signal to the request source. If the read is involved, step 712 stores the image data read out of the full-dot memory 11 in the read register in the memory control section 12.

Furthermore, step 713 shown in FIG. 7D decides on whether the memory control sequence has developed an error or not. If an error is developed, step 714 describes the error in an error register (not shown) in the memory control section 12. If there is not any error, by contrast, step 715 decides on read or write. If the write is involved, step 716 returns the contents of the error register and an end signal to the request source. If the read is involved, on the other hand, the read data, the data on the absence of error and an end signal are returned to the request source.

The present invention, which has been specifically explained above with reference to embodiments, is not limited to these embodiments but may of course be modified variously without departing from the spirit thereof.

As explained above, according to a print control system of the present invention, in the case of a printer requiring four segments of a full-dot memory for a 400-dpi printing mechanism, an estimate assuming each segment as an area of A3 size shows that a configuration with two-dimensional address would require a memory capacity of 32 MB while a configuration of one-dimensional address needs only 16 MB. Also, according to the present invention, the utility of 92% is registered by the one-dimensional address configuration as compared with 46% for the two-dimensional address configuration.

Further, in view of the fact that address conversion from two- to one-dimensional address is effected at high speed by multiply memory, the speed of printing control is not adversely affected by the addition of the address conversion.

We claim:

1. A print image data storage system comprising:
   means for generating digital print image data representing a plurality of dots to be printed on a sheet of paper, each of the dots being represented by one bit of the digital print image data and having a two-dimensional address associated therewith, the two-dimensional address including an x-address representing an abscissa of the dot on the sheet of paper and a y-address representing an ordinate of the dot on the sheet of paper;

a first register for designating y-addresses of the dots to be printed on the sheet of paper;

a second register for designating x-addresses of the dots to be printed on the sheet of paper;

a third register for designating information about the sheet of paper;

address conversion means responsive to the first register, the second register, and the third register for converting two-dimensional addresses specified by the y-addresses designated by the first register and the x-addresses designated by the second register to one-dimensional addresses based on the y-addresses designated by the first register, the x-addresses designated by the second register, and the information about the sheet of paper designated by the third register; and a one-dimensional full-dot memory receiving the digital print image data from the digital print image data generating means and responsive to the one-dimensional addresses from the address conversion means for storing the digital input image data at the one-dimensional addresses.

2. A system according to claim 1, wherein the information about the sheet of paper designated by the third register includes a size of the sheet of paper.

3. A system according to claim 2, wherein the information about the sheet of paper designated by the third register further includes an orientation of the sheet of paper.

4. A system according to claim 1, wherein the address conversion means includes a multiply memory for storing a table of results of multiplying the y-addresses designated by the first register by widths of a plurality of sheets of papers having different sizes and orientations, and wherein said multiply memory receives the y-addresses designated by the first register and the information about the sheet of paper designated by the third register and outputs portions of the one-dimensional addresses in response to the y-addresses designated by the first register and the information about the sheet of paper designated by the third register.

5. A system according to claim 4, wherein the address conversion means further includes an adder for adding the x-addresses designated by the second register to the portions of the one-dimensional addresses output by the multiply memory to produce the one-dimensional addresses.

* * * * *